United States Patent
Kobayashi et al.

(10) Patent No.: US 6,520,532 B2
(45) Date of Patent: Feb. 18, 2003

(54) PASSENGER-SIDE AIR BAG APPARATUS

(75) Inventors: Toru Kobayashi, Wako (JP); Makoto Yamada, Wako (JP); Testuya Oda, Wako (JP); Yoshihiko Morita, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/946,267

(22) Filed: Sep. 4, 2001

(65) Prior Publication Data

US 2002/0038946 A1 Apr. 4, 2002

(30) Foreign Application Priority Data

Oct. 3, 2000 (JP) ........................................ 2000-303332

(51) Int. Cl.[7] ............................................... B60R 21/16
(52) U.S. Cl. ..................................... 280/728.2; 280/732
(58) Field of Search ............................. 280/732, 728.2, 280/728.3

(56) References Cited

U.S. PATENT DOCUMENTS

| | | | | |
|---|---|---|---|---|
| 5,154,444 A | * | 10/1992 | Nelson ..................... | 280/728.3 |
| 5,342,088 A | * | 8/1994 | Bauer ....................... | 280/728.3 |
| 5,456,490 A | * | 10/1995 | Carter et al. .............. | 280/728.3 |
| 5,564,731 A | * | 10/1996 | Gallagher et al. ......... | 280/728.3 |
| 5,564,733 A | * | 10/1996 | Duenas et al. ............ | 280/728.3 |
| 5,580,081 A | * | 12/1996 | Berg et al. .................. | 180/90 |
| 5,639,116 A | | 6/1997 | Shimizu et al. | |
| 5,779,262 A | * | 7/1998 | Totani et al. ............. | 280/728.3 |
| 5,868,419 A | * | 2/1999 | Taguchi et al. .......... | 280/728.3 |
| 5,961,142 A | * | 10/1999 | Shiraki et al. ............ | 280/728.3 |
| 6,042,139 A | * | 3/2000 | Knox ...................... | 280/728.3 |
| 6,042,140 A | * | 3/2000 | Blazaitis et al. .......... | 280/728.3 |
| 6,062,590 A | * | 5/2000 | Gallagher ............... | 219/121.85 |
| 6,070,901 A | * | 6/2000 | Hazell et al. ............. | 280/728.3 |
| 6,106,003 A | * | 8/2000 | Rahmstorf et al. ....... | 280/728.3 |
| 6,120,055 A | * | 9/2000 | Cuevas et al. ........... | 280/728.2 |
| 6,145,871 A | * | 11/2000 | Davis et al. .............. | 280/728.2 |
| 6,250,669 B1 | * | 6/2001 | Ohmiya .................... | 280/728.2 |
| 6,328,367 B1 | * | 12/2001 | Eichhorn et al. ......... | 280/728.3 |
| 6,338,499 B2 | * | 1/2002 | Ueno et al. .............. | 280/728.2 |
| 6,378,894 B1 | * | 4/2002 | Trevino et al. ........... | 280/728.3 |

FOREIGN PATENT DOCUMENTS

| | | | | |
|---|---|---|---|---|
| JP | 60255438 A | * | 12/1985 | |
| JP | 6107074 | * | 4/1994 | ............. B60R/7/06 |
| JP | 7291079 A | * | 11/1995 | ........... B60R/21/20 |

* cited by examiner

Primary Examiner—Paul N. Dickson
Assistant Examiner—Joselynn Y Sliteris
(74) Attorney, Agent, or Firm—Carrier, Blackman & Associate, P.C.; Joseph P. Carrier; William D. Blackman (57) ABSTRACT

An air bag module of a passenger side air bag apparatus is sized and shaped to pass through a glove box opening portion of an instrument panel. An opening in an upper portion of a casing of the module faces the inner surface of an air bag lid, which is molded in one piece with a top wall part of the instrument panel. A lower portion of the module casing is fixed detachably to a steering hanger beam via a lower locking mechanism capable of being manipulated via the glove box opening portion. The upper portion of the module casing is fixed detachably to the top wall part of the instrument panel via an upper locking mechanism. Both the upper and lower locking mechanisms are capable of being manipulated via the glove box opening portion for easy installation and removal of the air bag module, but reliably support the module, even when the air bag is inflated and deployed.

17 Claims, 3 Drawing Sheets

FIG.3

PASSENGER-SIDE AIR BAG APPARATUS

FIELD OF THE INVENTION

The present invention relates to a passenger-side air bag apparatus, particularly, relates to a passenger-side air bag apparatus wherein an air bag module is placed within an instrument panel installed forward of a passenger seat and the air bag module can be easily attached and removed.

BACKGROUND OF THE INVENTION

A passenger-side air bag apparatus of a vehicle has an air bag module which houses an inflator and an air bag in a module case. The air bag module is supported by a structural member such as a steering hanger beam across an instrument panel and placed within the instrument panel installed forward of a passenger seat. An air bag lid is configured to be broken and open by inflation of the air bag. The air bag lid is mounted on the opening portion of the module case to cover the air bag in the module case, or molded in one piece on the top wall of the instrument panel installed forward of the passenger seat in advance.

With the air bag module having the air bag lid mounted on the opening portion of the module case, the air bag module is inserted from above into an opening for mounting on the top wall of the instrument panel installed forward of the passenger seat. The lower portion of the module case is fixed detachably via tightening means on the structural member such as a steering hanger beam. A tightening means includes a bracket, a stud bolt, a nut and the like. The edge of the air bag lid on the top end of the module case is locked on the periphery of the opening for mounting.

With the air bag lid molded in one piece on the top wall of the instrument panel, in a state in which the opening portion of the module case is opposed to the inner surface of the air bag lid, the fore-and-aft part in the vicinity of the opening portion is fixed in advance detachably via the tightening means on the inner surface of the instrument panel. After the instrument panel is mounted on a car body, the lower portion of the module case is fixed detachably via the tightening means on the structural member such as a steering hanger beam.

There is a problem about the passenger-side air bag apparatus having the air bag module with the air bag lid. Specifically speaking, the air bag lid on the top end of the module case inserted into the opening for mounting on the top wall of the instrument panel is exposed at the outer surface of the instrument panel. Therefore, togetherness of the instrument panel is impaired and the instrument panel is defiled.

The passenger-side air bag apparatus which has the air bag lid molded in one piece on the top wall of the instrument panel in advance, is free from the above-described problem. However, There is another problem about this type of passenger-side air bag apparatus. Specifically speaking, when the air bag module is attached to and removed from the instrument panel to perform a check or maintenance thereon, the attaching and removing operation requires a multitude of man-hours. Front and rear tightening means fix the front and rear of the upper portion of the module case to the inner surface of the instrument panel. When the air bag module of this type of passenger-side air bag apparatus is attached to and removed from the instrument panel, the front and rear tightening means are to be attached and removed, e.g., via an opening portion for a glove box of the instrument panel. In the state in which the instrument panel is mounted on a car body as a practical matter, various structures such as a steering hanger beam, a dashboard and the like interfere with the operation. Therefore, the front tightening means of the upper portion of the module case cannot be attached and removed in such state. As a result, to attach and remove the air bag module, the instrument panel must be removed from the car body temporarily and a multitude of man-hours is needed.

Therefore, an object of the present invention is to provide a passenger-side air bag apparatus having an air bag module which can be easily attached and removed without defiling an instrument panel and without attaching and removing the instrument panel.

SUMMARY OF THE INVENTION

To achieve the above-mentioned object, a passenger-side air bag apparatus according to the present invention comprises:

an air bag lid molded in one piece with a top wall part of an instrument panel forward of a passenger seat in a vehicle; and an air bag module capable of passing through a glove box opening portion formed on a side wall part of the instrument panel forward of the passenger seat;

the air bag module being disposed within the instrument panel in a state in which an opening portion of the top end of a module case housing an inflator and an air bag faces the inner surface of the air bag lid, a lower portion of the module case is fixed detachably to a structural member laid across the instrument panel via a lower portion fastening mechanism capable of being operatively manipulated via the glove box opening portion, and an upper portion of the module case is fixed detachably to the top wall part of the instrument panel via an upper locking mechanism also capable of being operatively manipulated via the glove box opening portion.

The air bag module of a passenger-side air bag apparatus according to the present invention may be readily removed to the outside of the instrument panel to perform a check or maintenance thereon. First, a tool such as an impact wrench releases the lower portion tightening means. Next, the lower portion of the module case is detached from the structural member by manual work via the glove box opening portion. Subsequently, the module case is moved in a predetermined direction so that the upper locking mechanism is released and the upper portion of the module case is detached from the top wall part of the instrument panel. The whole of the air bag module is then taken out through the glove box opening portion to the outside of the instrument panel. After the check and maintenance for the air bag module is performed, a reverse procedure is carried out for re-installing the air bag module. The upper portion of the module case is locked on the top wall part of the instrument panel by the upper locking mechanism. The lower portion of the module case is fixed to a support member via the lower portion locking mechanism.

In regard to a passenger-side air bag apparatus according to the present invention, it is preferable that the upper locking mechanism comprises a front locking means for locking the front of the upper portion of the module case and a rear locking means for locking the rear of the upper portion of the module case. In the event of a collision, the air bag breaks the air bag lid when the air bag is inflated and expands toward the passenger seat of the car body. The front and rear locking means reliably prevent the module case from moving to tilt in a fore-and-aft direction due to reaction of inflating and expanding of the air bag.

In regard to a passenger-side air bag apparatus according to the present invention, it is preferable that the upper locking mechanism comprises a front locking means for locking the front of the upper portion of the module case and a rear locking means for detachably fixing the rear of the upper portion of the module case to the top wall part of the instrument panel, the rear locking means is capable of being manipulated via the glove box opening portion. In the event of collision, the air bag breaks the air bag lid when the air bag is inflated and expands toward the passenger seat of the car body. The front locking means and the rear locking means further reliably prevent the module case from moving to tilt in a fore-and-aft direction due to reaction of inflating and expanding of the air bag.

DETAILED DESCRIPTION OF THE PREFERRED EMBODIMENTS

Figure 1:
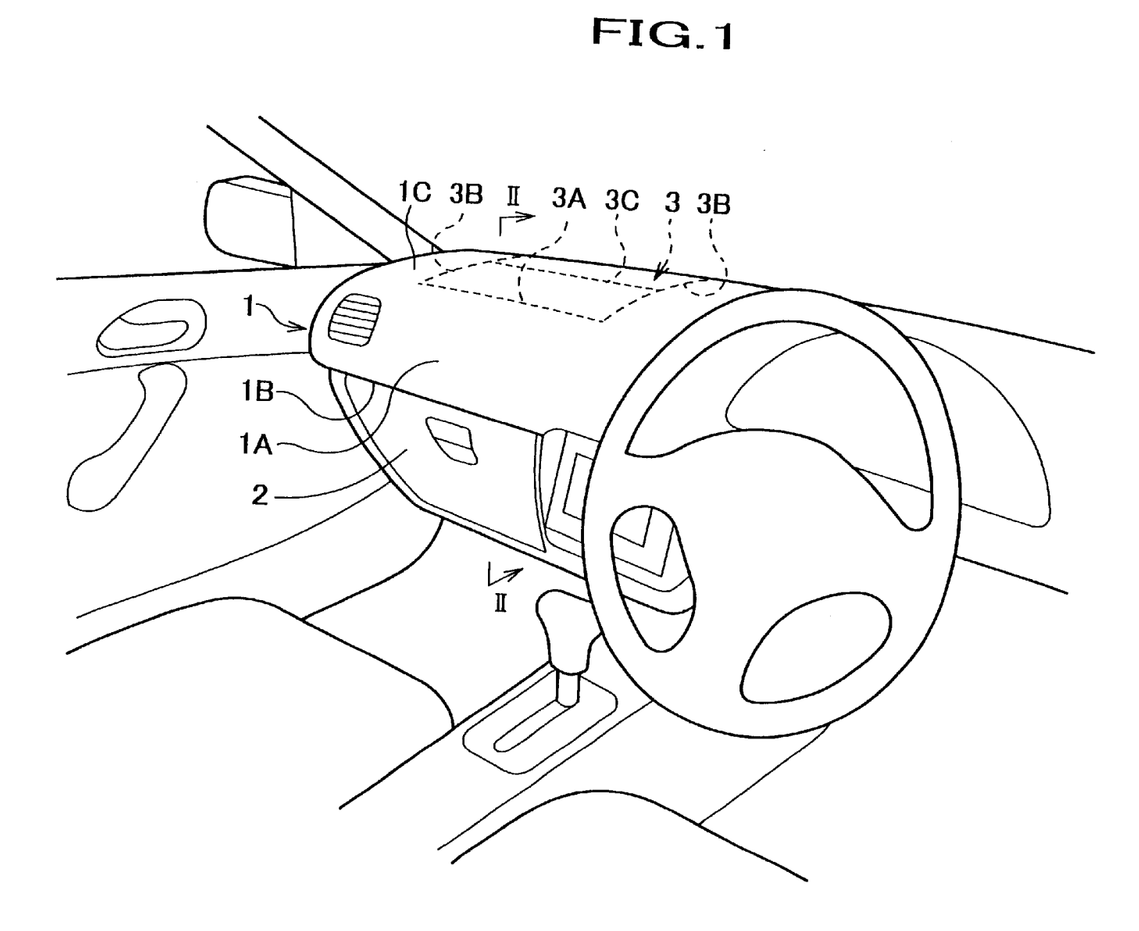
FIG. 1 is a perspective view showing an instrument panel of a vehicle in which an air bag module of a passenger-side air bag apparatus according to an embodiment of the invention is placed.
Figure 2:
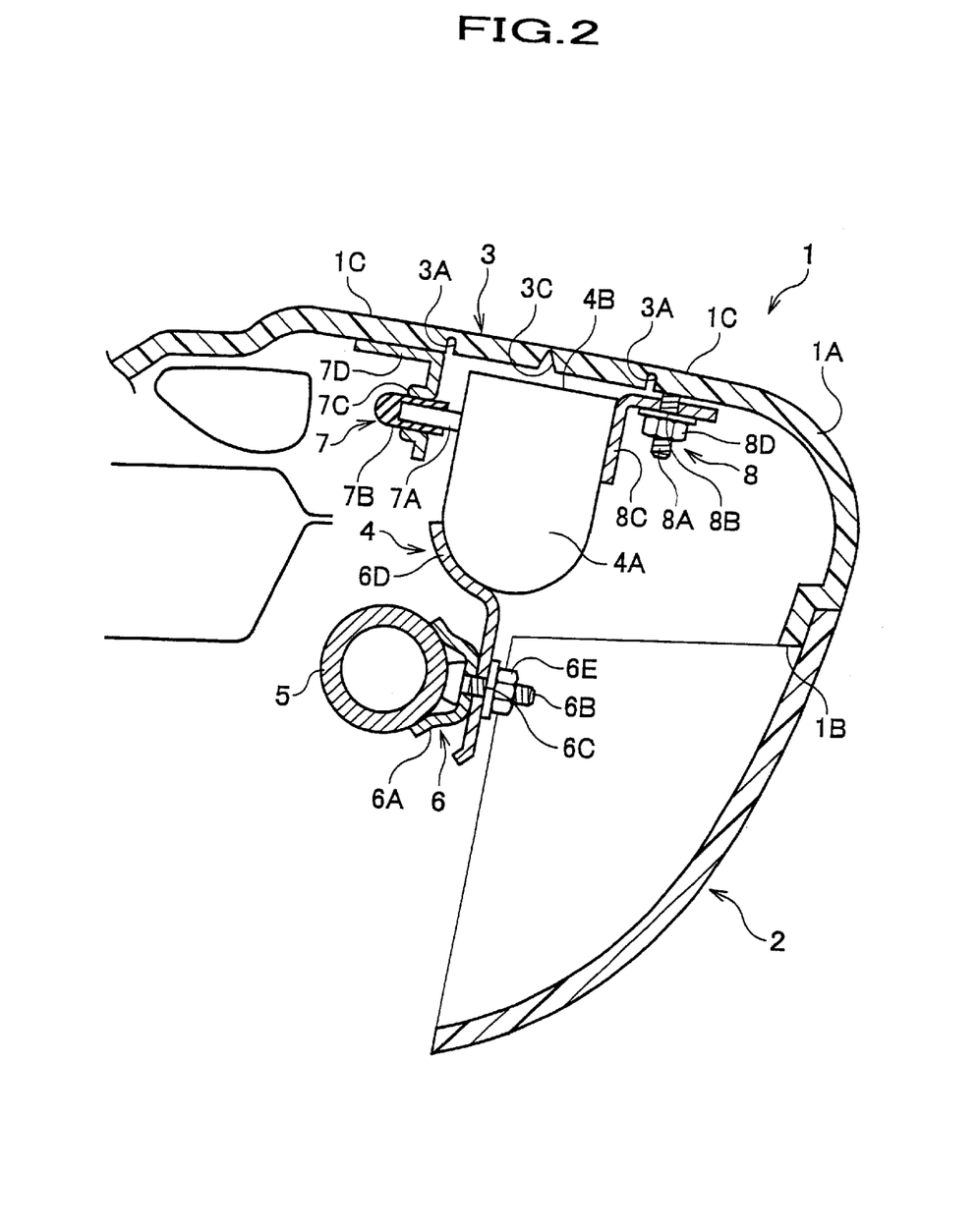
FIG. 2 is a sectional view taken along a line II—II in FIG. 1 showing installation structure of the air bag module of the passenger-side air bag apparatus according to the embodiment.

An embodiment of a passenger-side air bag apparatus according to the present invention will now be described with reference to the drawings. FIG. 1 is a perspective view showing an instrument panel of a vehicle in which an air bag module of a passenger-side air bag apparatus according to an embodiment of the invention is placed. FIG. 2 is a sectional view taken along a line II—II in FIG. 1 showing installation structure of the air bag module.

As shown in FIG. 1 and 2, a passenger-side air bag apparatus according to an embodiment is applied to an instrument panel 1 of a vehicle, and the instrument panel 1 has an opening portion 1B for a glove box 2 (hereafter referred to as the glove box opening portion 1B) formed on a lower portion of a side wall part 1A of the panel forward of a passenger seat. The glove box opening portion 1B has the glove box 2 fitted therein, the glove box being capable of opening and closing, and is mounted detachably. A top wall part 1C of the instrument panel 1 lies above the upper portion of the glove box 2. An air bag lid 3 of a passenger-side air bag apparatus according to the embodiment is molded in one piece with the top wall part 1C.

The air bag lid 3 is, as shown in FIG. 2, partitioned from the top wall part 1C by front and rear channels for hinges 3A, 3A (hereafter referred to as the hinge channels) and right and left channels for fracture 3B, 3B (hereafter referred to as the fracture channels) (see FIG. 1). The front and rear hinge channels 3A, 3A are formed on an inner surface of the top wall part 1C in a lateral direction of a vehicle body. The right and left fracture channels 3B, 3B are formed on the inner surface of the top wall part 1C in a fore-and-aft direction of the vehicle body. The midsection in a fore-and-aft direction of the inner surface of the air bag lid 3 has a channel for fracture 3C (hereafter referred to as the fracture channel) formed in parallel with the hinge channels 3A, 3A. An air bag of a passenger-side air bag apparatus according to the embodiment inflates and the fracture channels 3B, 3C of the air bag lid 3 are broken. Respective halves of the air bag lid 3 then rotate with the hinge channels 3A, 3A as supports toward the upper portion of the top wall part 1C in a fore-and-aft direction and the air bag lid 3 is opened.

An air bag module 4 of the passenger-side air bag apparatus according to an embodiment is set in sizes capable of passing through the glove box opening portion 1B of the instrument panel 1. A canaliculate module case 4A houses an inflator and the air bag (not shown). The air bag module 4 is placed within the instrument panel 1 in a state in which an opening portion 4B of the top end of the module case 4A faces the inner surface of the air bag lid 3.

The inflator is housed within a lower portion of the module case 4A. The inflator is ignited by an ignition signal from an acceleration sensor (not shown) and generates a high-pressure nitrogen gas. The air bag is housed in a predetermined shape in a folded state above the inflator. The high-pressure nitrogen gas generated by the inflator is blown into the air bag and then the air bag is inflated and developed.

The lower portion of the module case 4A of the passenger-side air bag apparatus according to the embodiment is fixed detachably to a steering hanger beam 5 via a lower portion tightening means, or locking mechanism 6. The steering hanger beam 5 is laid across the instrument panel 1 as a structural member. The lower portion tightening means, or locking mechanism 6 is provided which is capable of being operatively manipulated via the glove box opening portion 1B. The lower portion tightening means, or mechanism 6 has a mount bracket 6A, a stud bolt 6B, a through hole 6C, a tightening bracket 6D and a nut 6E. The mount bracket 6A is welded on the rear of the steering hanger beam 5, which faces the glove box opening portion 1B. A base part of the stud bolt 6B is fixed on the mount bracket 6A and a tip part of the stud bolt 6B projects toward the glove box opening portion 1B. The through hole 6C for inserting the stud bolt 6B is formed on a lower portion of the tightening bracket 6D. The upper portion of the tightening bracket 6D is welded on the lower portion of the module case 4A. The nut 6E is screwed to the tip part of the stud bolt 6B piercing through the through hole 6C of the tightening bracket 6D.

The upper portion of the module case 4A is locked on and capable of engaging and removing with respect to the top wall part 1C of the instrument panel 1 via an upper locking means or mechanism. The upper locking means or mechanism is capable of being operatively manipulated via the glove box opening portion 1B. Specifically speaking, the front of the upper portion of the module case 4A of a passenger-side airbag apparatus according to an embodiment is locked on and capable of engaging and removing with respect to the top wall part 1C of a forward part of the air bag lid 3 via a front locking means 7. The front locking means 7 is capable of being operatively manipulated via the glove box opening portion 1B. The front locking means, or mechanism 7 has an engaging pin 7A, a bushing 7B, a locking hole 7C and a locking bracket 7D. The engaging pin 7A is projected toward the front from the front of the upper portion of the module case 4A. The tip of the engaging pin 7A is covered with the bushing 7B for absorbing vibration. The locking hole 7C for inserting the bushing 7B is formed on a lower portion of the locking bracket 7D which has an L-shaped cross-section. The upper portion of the locking bracket 7D is fixed on the inner surface of the top wall part 1C of the forward part of the air bag lid 3. The lower portion of the locking bracket 7D with the locking hole 7C faces the front of the upper portion of the module case 4A. The module case 4A is pushed manually forward by an operator via the glove box opening portion 1B, whereby the engaging pin 7A is easily inserted into the locking hole 7C via the bushing 7B.

The rear of the upper portion of the module case 4A is fixed detachably to the top wall part 1C of the rear part of the air bag lid 3 via a rear tightening or locking means 8. The rear tightening or locking means 8 is also capable of being operatively manipulated via the glove box opening portion 1B. The rear tightening means 8 has a stud bolt 8A, a through hole 8B, a tightening bracket 8C and a nut 8D. The stud bolt 8A is projected downward from the inner surface of the top wall part 1C of the rear part of the air bag lid 3. The through hole 8B for inserting the stud bolt BA is formed on the upper portion of the tightening bracket 8C which is L-shaped in cross-section. A lower portion of the tightening bracket 8C is welded on the rear of the upper portion of the module case 4A. The nut 8D is screwed to the lower end of the stud bolt 8A piercing through the through hole 8B of the tightening bracket 8C. The bolt 8A is placed in a position wherein the nut 8D can be attached and removed easily by a tool such as an impact wrench inserted from the glove box opening portion 1B.

Figure 3:
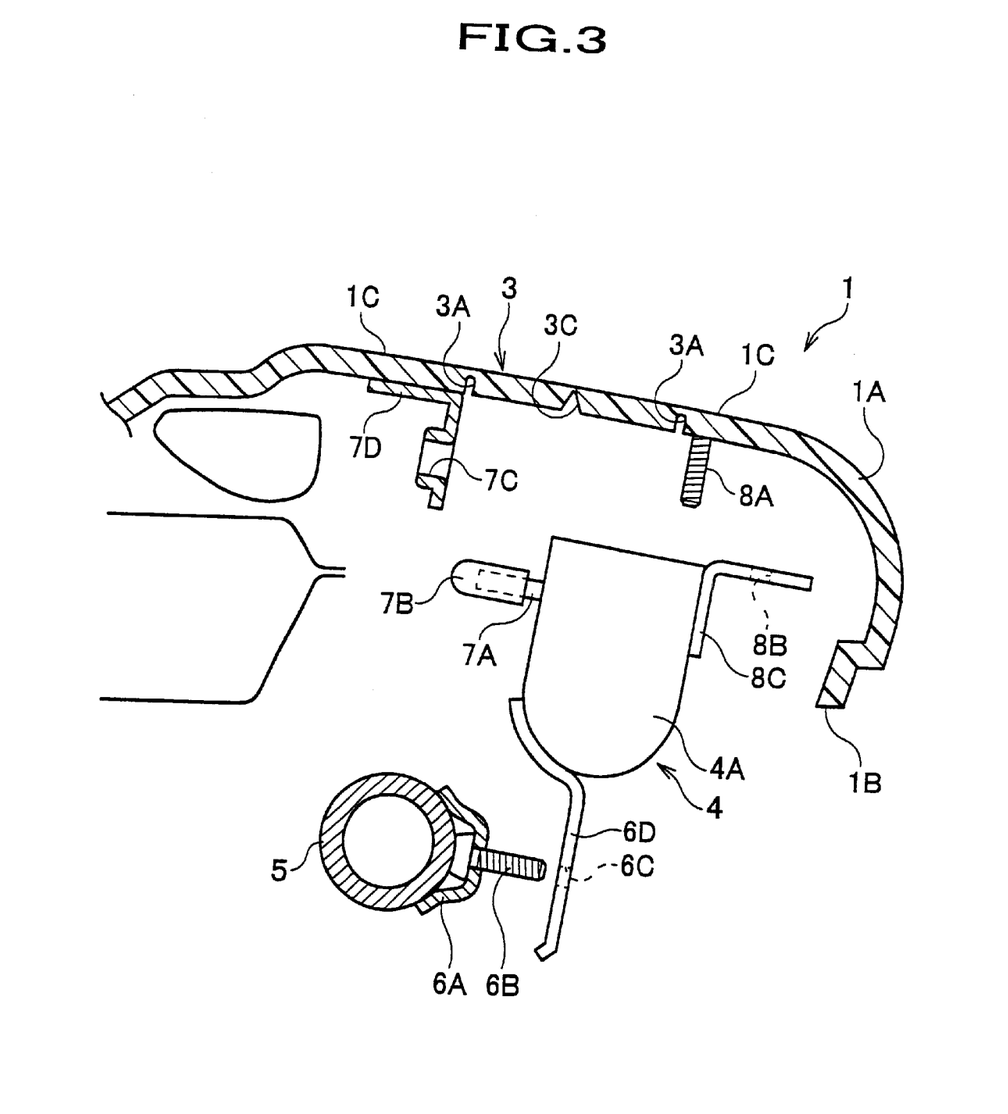
FIG. 3 is a sectional view corresponding to FIG. 2 explaining attaching and removing operations of the air bag module of the passenger-side air bag apparatus according to the embodiment.

The operation will now be described wherein the air bag module 4 of the above-mentioned passenger-side air bag apparatus according to the embodiment is removed to the outside of the instrument panel 1 to perform a check or maintenance thereon. First, the glove box 2 forward of the passenger seat is opened, or the glove box 2 is removed and the glove box opening portion 1B of the instrument panel 1 is opened widely. A tool such as an impact wrench is inserted through the glove box opening portion 1B and the nut 6E is removed from the stud bolt 6B of the lower portion locking mechanism 6. At the same time, the nut 8D is removed from the stud bolt 8A of the rear tightening or locking means 8.

The lower portion of the module case 4A is lowered by manual work via the glove box opening portion 1B and the tightening bracket 8C is pulled off of the stud bolt 8A of the rear tightening or locking means 8. The upper portion of the module case 4A is moved to tilt in a rear direction, at the same time the engaging pin 7A is pulled out of the locking hole 7C of locking bracket 7D, together with the bushing 7B. Subsequently, the lower portion of the module case 4A is pulled frontward and the tightening bracket 6D is pulled off of the stud bolt 6B of the lower portion locking mechanism 6. The whole of the air bag module 4 is then taken out through the glove box opening portion 1B to the outside of the instrument panel 1 while the attitude of the air bag module 4 is changed as appropriate.

After the check and maintenance for the air bag module 4 is performed, a reverse procedure is carried out for reinstalling the air bag module 4. The front of the upper portion of the module case 4A is first locked on the top wall part 1C of the forward part of the air bag lid 3 of the instrument panel 1 by the front locking means 7. Next, the rear of the upper portion of the module case 4A is fixed to the top wall part 1C of the rear part of the air bag lid 3 of the instrument panel 1 via a rear tightening or locking means 8. The lower portion of the module case 4A is fixed to the steering hanger beam 5 via the lower portion locking mechanism 6.

In the state in which the air bag module 4 is fixed in this way, the engaging pin 7A of the front locking means 7 projected from the module case 4A is locked into the locking hole 7C of the locking bracket 7D via the bushing 7B for absorbing vibration. As a result of this, in case the module case 4A is vibrated by vehicle vibration, the vibration is absorbed and damped by the bushing 7B, therefore annoying vibration noise is prevented.

The air bag module 4 of a passenger-side air bag apparatus according to the embodiment is placed within the instrument panel 1. The inflator housed within the module case 4A is ignited by an ignition signal from an acceleration sensor (not shown) and generates a high-pressure nitrogen gas. The air bag housed within the module case 4A is inflated by the high-pressure nitrogen gas to break the air bag lid 3 and then inflated and developed from the air bag lid 3, which is opened in a fore-and-aft direction, toward the passenger seat of the car body. At this time, reaction is applied to the module case 4A by inflating and developing of the air bag downward and forward with respect to the car body. However, in regard to the passenger-side air bag apparatus according to the embodiment, the lower portion of the module case 4A is fixed to the steering hanger beam 5 via the lower portion locking mechanism 6. The front of the upper portion of the module case 4A is locked on the top wall part 1C of the instrument panel 1 by the front locking means 7. The rear of the upper portion of the module case 4A is fixed to the top wall part IC via the rear tightening or locking means 8. Therefore, the module case 4A can inflate and develop the air bag toward the passenger seat with reliability while an intended attitude of the module case 4A is maintained.

In regard to a passenger-side air bag apparatus according to the present invention, the upper locking means, or mechanism, may include the above-mentioned front locking means 7 according to the above-described embodiment and an extra rear locking means for locking the rear of the upper portion of the module case 4A. In this case, the rear tightening or locking means 8 according to the above-described embodiment can be simply replaced by the extra rear locking means. Specifically speaking, as one example, the nut 8D of the rear tightening or locking means 8 may be removed and the tip of the stud bolt 8A may be covered with a bushing. As another example, the stud bolt 8A may be replaced with an engaging pin.

In regard to a passenger-side air bag apparatus according to the present invention, the upper locking mechanism may include a left locking means for locking the left side of the upper portion of a module case and a right locking means for locking the right side of the upper portion of the module case, the left side and right locking means having a structure corresponding to the front and rear locking means described above. The left locking means has, for example, an engaging pin, a bushing, a notch channel and a locking bracket. The engaging pin is projected toward the left from the left of the upper portion of the module case 4A according to such an embodiment. The tip of the engaging pin is covered with the bushing. The notch channel in the shape of an L or the like for locking the bushing is formed on a lower portion of the locking bracket which has an L-shaped cross-section. The upper portion of the locking bracket is fixed to the top wall part 1C of the left of the air bag lid 3. The right locking means may be symmetrical about the left locking means laterally.

In regard to a passenger-side air bag apparatus according to the present invention, an air bag lid is molded in one piece with a top wall part of an instrument panel. Therefore, the instrument panel is not defiled and its aesthetic appearance is not impaired. Further, an air bag module of the apparatus is capable of passing through a glove box opening portion. A lower portion locking mechanism fixing the lower portion of said module case to a structural member permits selective attaching and removing of the module case from said glove box opening portion. An upper locking mechanism locking the upper portion of the module case to the top wall part of the instrument panel also permits selective engaging and removing of the module case with respect to the glove box opening portion. Therefore, the air bag module can be easily attached and removed without attaching and removing the instrument panel.

In regard to a passenger-side air bag apparatus according to the present invention, it is preferable that the upper locking mechanism comprises a front locking means for locking the front of the upper portion of the module case and a rear locking means for locking the rear of the upper portion of the module case. The air bag breaks the air bag lid when the air bag is inflated and expands toward the passenger seat of the car body. The front and rear locking means reliably prevent the module case from moving to tilt in a fore-and-aft direction due to reaction of inflating and developing of the air bag. Therefore, the air bag module can be easily attached and removed, and the module case can inflate and develop the air bag toward the rear part of the car body with reliability.

In regard to a passenger-side air bag apparatus according to the present invention, it is preferable that said upper locking mechanism comprises a front locking means for locking the front of the upper portion of the module case, and the rear of the upper portion of said module case is fixed detachably to the top wall part of the instrument panel via a rear tightening or locking means which is capable of being operatively manipulated via the glove box opening portion. The air bag breaks the air bag lid when the air bag is inflated and expands toward the passenger seat of the car body. The front locking means and the rear tightening or locking means further reliably prevent the module case from moving to tilt in a fore-and-aft direction due to reaction of inflating and developing of the air bag. Therefore, the air bag module can be easily attached and removed, and the module case can inflate and develop the air bag toward the rear part of the car body with added reliability.

Although there have been described what are the present embodiments of the invention, it will be understood that variations and modifications may be made thereto without departing from the gist, spirit or essence of the invention. The scope of the invention is indicated by the appended claims.

What is claimed is:

1. A passenger-side air bag apparatus for installation in a vehicle, said apparatus comprising:
   an air bag lid molded in one piece with a top wall part of an instrument panel for placement forward of a passenger seat in said vehicle, said air bag lid having an inner surface,
   a glove box opening portion formed in a side wall part of said instrument panel and to which a glove box is attached; and
   an air bag module capable of passing through said glove box opening portion;
   said air bag module comprising a module case and being disposed within said instrument panel at a level above said glove box in a state in which
   an opening of an upper portion of said module case housing an inflator and an air bag faces the inner surface of said air bag lid,
   a lower portion of said module case being detachably fixable to a structural member laid across said instrument panel via a lower portion fastening mechanism capable of being operatively manipulated via said glove box opening portion, and
   the upper portion of said module case being detachably fixed to said top wall part of said instrument panel via an upper locking mechanism also capable of being operatively manipulated via said glove box opening portion;
   whereby said air bag module is situated so as to be accessible and serviceable through said glove box opening portion.

2. A passenger-side air bag apparatus according to claim 1, wherein said upper locking mechanism comprises a front locking means for locking a front of the upper portion of said module case and a rear locking means for locking a rear of the upper portion of said module case.

3. A passenger-side air bag apparatus according to claim 1, wherein said upper locking mechanism is composed of a front locking means for locking a front of the upper portion of said module case and a rear locking means for detachably fixing a rear of the upper portion of said module case to said top wall part of said instrument panel, said rear locking means is capable of being operatively manipulated via said glove box opening portion.

4. A passenger-side air bag apparatus according to claim 1, wherein said upper locking mechanism comprises a first locking means for locking a first side of the upper portion of said module case and a second locking means for locking a second side of the upper portion of said module case.

5. A passenger-side air bag apparatus according to claim 1, wherein said air bag lid includes fracture channels defined in a lower surface of said top wall part of said instrument panel.

6. A passenger-side air bag apparatus according to claim 1, wherein said upper locking mechanism includes multiple fasteners for securing multiple portions of the module case to said top wall part of said instrument panel, and one of said fasteners comprises a pin which is inserted into and withdrawn from a locking hole to detachably fix one said portion of the module case to said top wall part of said instrument panel.

7. A passenger-side air bag apparatus according to claim 6, wherein said upper locking mechanism further includes a vibration damping member provided with said pin.

8. A passenger-side air bag apparatus for installation in a vehicle, said apparatus comprising:
   an air bag lid molded in one piece with a top wall part of an instrument panel for placement forward of a passenger seat in said vehicle, said air bag lid having an inner surface;
   a glove box opening portion formed in a side wall part of said instrument panel and to which a glove box is attached; and
   an air bag module including an air bag and an inflator housed in a case, said module being disposed within said instrument panel at a level above said glove box and being capable of passing through said glove box opening portion;
   and an opening in an upper portion of said case facing the inner surface of said air bag lid when installed in the vehicle;
   an upper locking mechanism which detachably fixes sad upper portion of said module case to said instrument panel; and
   a lower locking mechanism for detachably fixing a lower portion of said module case to a structural member laid across said instrument panel;

wherein said upper and lower locking mechanisms are capable of being operatively manipulated via said glove box opening.

9. A passenger-side air bag apparatus according to claim 8, wherein said upper locking mechanism comprises a front locking means for locking a front of the upper portion of said module case and a rear locking means for locking a rear of the upper portion of said module case.

10. A passenger-side air bag apparatus according to claim 8, wherein said upper locking mechanism is composed of a front locking means for locking a front of the upper portion of said module case and a rear locking means for detachably fixing a rear of the upper portion of said module case to said top wall part of said instrument panel, said rear locking means is capable of being operatively manipulated via said glove box opening portion.

11. A passenger-side air bag apparatus according to claim 8, wherein said upper locking mechanism comprises a first locking means for locking a first side of the upper portion of said module case and a second locking means for locking a second side of the upper portion of said module case.

12. A passenger-side air bag apparatus according to claim 8, wherein said air bag lid includes fracture channels defined in a lower surface of said top wall part of said instrument panel.

13. A passenger-side air bag apparatus according to claim 8, wherein said upper locking mechanism includes multiple fasteners for securing portions of the module case to said top wall part of said instrument panel, and one of said fasteners comprises a pin which is inserted into and withdrawn from a locking hole to detachably fix one said portion of the module case to said top wall part of said instrument panel.

14. A passenger-side air bag apparatus according to claim 13, wherein said upper locking mechanism further includes a vibration damping member provided with said pin.

15. A passenger-side air bag apparatus for installation in a vehicle, said apparatus comprising:
   an instrument panel having a top wall part and a side wall part;
   an air bag lid molded in one piece with the top wall part of said instrument panel for placement forward of a passenger seat in said vehicle, said air bag lid having an inner surface;
   a glove box opening portion formed in the side wall part of said instrument panel and to which a glove box is attached; and
   an air bag module being disposed within said instrument panel at a level above said glove box and being capable of passing through said glove box opening; said air bag module comprising a module case and being disposed within said instrument panel such that:
      an opening of an upper portion of said module case faces the inner surface of said air bag lid,
      a lower portion of said module case is adapted to be detachably fixable to a structural member laid across said instrument panel via a lower portion fastening mechanism capable of being operatively manipulated via said glove box opening portion, and
      the upper portion of said module case being detachably fixed to said top wall part of said instrument panel via an upper locking mechanism also capable of being operatively manipulated via said glove box opening portion;
   whereby said air bog module is situated so as to be accessible and serviceable through said glove box opening portion.

16. A passenger-side air bag apparatus according to claim 15, wherein said upper locking mechanism includes multiple fasteners for securing multiple portions of the module case to said top wall part of said instrument panel, and one of said fasteners comprises a pin which is inserted into and withdrawn from a locking hole to detachably fix one said portion of the module case to said top wall part of said instrument panel.

17. A passenger-side air bag apparatus according to claim 15, wherein said upper locking mechanism further includes a vibration damping member provided with said pin.

* * * * *

UNITED STATES PATENT AND TRADEMARK OFFICE
CERTIFICATE OF CORRECTION

PATENT NO. : 6,520,532 B2
DATED : February 18, 2003
INVENTOR(S) : Toru Kobayashi et al.

It is certified that error appears in the above-identified patent and that said Letters Patent is hereby corrected as shown below:

Title page,
Item [75], Inventors, correct "Testuya' to -- Tetsuya --.
Item [56], References Cited, U.S. PATENT DOCUMENTS, add the following references cited by the examiner:

| | | | |
|---|---|---|---|
| -- 4,770,439 A * | 9/1998 | Maier et al. | 280/728.2 |
| 5,072,967 A * | 12/1991 | Batchelder et al. | 280/732 |
| 5,190,314 A * | 3/1993 | Takasugi | 280/732 |
| 5,273,310 A * | 12/1993 | Terai | 280/732 |
| 5,316,335 A * | 5/1994 | Gray et al. | 280/732 |
| 5,385,378 A * | 1/1995 | Hakamada et al. | 16//374 |
| 5,863,064 A * | 1/1999 | Rheinlander et al. | 280/732 |
| 5,876,061 A * | 3/1999 | Stavermann | 280/732 |
| 6,123,356 A * | 9/2000 | Gray et al. | 280/732 |
| 6,152,480 A * | 11/2000 | Iwanaga | 280/728.3 |
| 6,196,588 B1 * | 3/2001 | Sugawara | 180/90 |
| 6,406,056 B2 * | 6/2002 | Yokota | 280/732 |
| 6,435,542 B2 * | 8/2002 | Nakashima | 280/728.3 --. |

Item [56], References Cited, FOREIGN PATENT DOCUMENTS", add the following references cited by the examiner:

| | | | | |
|---|---|---|---|---|
| -- JP | 5301534 A | * | 11/1993 | B60K/37/04 |
| JP | 5305840 A | * | 11/1993 | B60K/37/04 |
| EP | 0583079 A1 | * | 2/1994 | B60R/21/20 --. |

Column 1,
Line 55, change "There" to -- there --.

Column 2,
Line 1, after "body" insert a comma.

Column 4,
Line 43, delete "locked on and".
Line 44, change "capable of engaging and removing with respect" to -- detachably fixed --.
Line 49, change "of a" to -- of the --.
Line 50, change "an" to — the --.

UNITED STATES PATENT AND TRADEMARK OFFICE
CERTIFICATE OF CORRECTION

PATENT NO. : 6,520,532 B2
DATED : February 18, 2003
INVENTOR(S) : Toru Kobayashi et al.

It is certified that error appears in the above-identified patent and that said Letters Patent is hereby corrected as shown below:

Column 5,
Line 14, change "BA" to -- 8A --.
Line 34, change "mechanism6" to -- mechanism 6 --.

Column 6,
Line 23, change "IC" to -- 1C --
Line 46, delete "side".

Column 7,
Line 27, change "said module case" to -- the module case --.
Line 52, change "surface," to -- surface; --.

Column 8,
Line 62, change "sad" to -- said --.

Column 10,
Line 24, change "air bog" to -- air bag --.

Signed and Sealed this

Nineteenth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.         : 6,520,532 B2
APPLICATION NO.    : 09/946267
DATED              : February 18, 2003
INVENTOR(S)        : Kobayashi et al.

It is certified that error appears in the above-identified patent and that said Letters Patent is hereby corrected as shown below:

Title Page:
   item "(75)    Inventors:" section, correct "Testuya" to --Tetsuya--.
   item "(56)    References Cited", further under "U.S. PATENT DOCUMENTS", add the following references cited by the examiner:
-- 4,770,439  A  *   9/1988    Maier et al. .............280/728.2
   5,072,967  A  *  12/1991    Batchelder et al. .....280/732
   5,190,314  A  *   3/1993    Takasugi ................280/732
   5,273,310  A  *  12/1993    Terai .....................280/732
   5,316,335  A  *   5/1994    Gray et al. .............280/732
   5,385,378  A  *   1/1995    Hakamada et al. .... 16/374
   5,863,064  A  *   1/1999    Rheinlander et al. ..280/732
   5,876,061  A  *   3/1999    Stavermann .......... 280/732
   6,123,356  A  *   9/2000    Gray et al. .............280/732
   6,152,480  A  *  11/2000    Iwanaga ................280/728.3
   6,196,588  B1 *   3/2001    Sugawara ..............180/90
   6,406,056  B2 *   6/2002    Yokota ..................280/732
   6,435,542  B2 *   8/2002    Nakashima ............280/728.3 --.
   item "(56) References Cited", further under "FOREIGN PATENT DOCUMENTS", add the following references cited by the examiner:
-- JP  5301534  A   * 11/1993 ......... B60K/37/04
   JP  5305840  A   * 11/1993 ......... B60K/37/04
   EP  0583079  A1  *  2/1994 ......... B60R/21/20 --.

Column 1:
   Line 55, change "There" to - -there- -.

Column 2:
   Line 1, after "body" insert a comma.

Column 4:
   Line 43, delete "locked on and".
   Line 44, change "capable of engaging and removing with respect" to - -detachably fixed- -.
   Line 49, change "of a" to - -of the- -.
   Line 50, change "an" to - -the- -.

UNITED STATES PATENT AND TRADEMARK OFFICE
CERTIFICATE OF CORRECTION

PATENT NO. : 6,520,532 B2
APPLICATION NO. : 09/946,267
DATED : February 18, 2003
INVENTOR(S) : Kobayashi, et al.

It is certified that error appears in the above-identified patent and that said Letters Patent is hereby corrected as shown below:

Column 5:
    Line 14, change "BA" to - -8A- -.
    Line 34 35, change "mechanism6" to - -mechanism 6- -.

Column 6:
    Line 23, change "IC" to - -1C- -.
    Line 46, delete "side".

Column 7:
    Line 27, change "said module case" to - -the module case- -.
    Line 52 53 (6th line of claim 1), change "surface," to - -surface;- -.

Column 8:
    Line 62 (18th line of claim 8), change "sad" to - -said- -.

Column 10:
    Line 25, change "air bog" to - -air bag- -.

Signed and Sealed this

Eighth Day of August, 2006

JON W. DUDAS
*Director of the United States Patent and Trademark Office*